United States Patent [19]

Kim

[11] Patent Number: 5,609,782
[45] Date of Patent: Mar. 11, 1997

[54] SHIELDING GAS PRE-FLOW TIME CONTROL SYSTEM FOR GAS METAL ARC WELDER

[75] Inventor: Jong-Hee Kim, Ulsani-Si, Rep. of Korea

[73] Assignee: Hyundai Heavy Industries Co., Ltd., Ulsani-Si, Rep. of Korea

[21] Appl. No.: 547,335

[22] Filed: Oct. 24, 1995

[30] Foreign Application Priority Data

Oct. 29, 1994 [KR] Rep. of Korea ............. 94-28446

[51] Int. Cl.⁶ ......................................... B23K 9/16
[52] U.S. Cl. ................................. 219/132; 219/74
[58] Field of Search ..................... 219/74, 125.1, 219/132, 136, 137.71, 75

[56] References Cited

U.S. PATENT DOCUMENTS

| | | | |
|---|---|---|---|
| 3,617,681 | 11/1971 | Dyson | 219/74 |
| 3,662,147 | 5/1972 | Ogden, Sr. et al. | 219/137.71 |
| 4,100,390 | 7/1978 | Jackson | 219/74 |
| 4,531,045 | 7/1985 | Kemp | 219/132 |

*Primary Examiner*—Clifford C. Shaw
*Attorney, Agent, or Firm*—Armstrong, Westerman, Hattori, McLeland & Naughton

[57] ABSTRACT

A shielding gas pre-flow time control system for a gas metal arc welder for generating an arc simultaneously with the turning on of a torch switch for directing a torch to a normal position while maintaining a sufficient pre-flow time of shielding gas for more than one (1) second. The gas metal arc welder includes a welding power source, a wire feeding device and a welding torch in which, when the torch switch is firstly turned on, only the shielding gas solenoid valve is activated to cause the shielding gas solenoid valve is actuated to cause the shielding gas to be pre-flowed. When the switch is secondly turned on, during the pre-flow time, the wire feeding device is operated and simultaneously a voltage is applied to the wire being fed and an arc is generated so as to start the welding. When the torch switch is turned off, wire feeding device is stopped, the shielding gas feed is stopped and the welding arc is stopped; all at the same time.

2 Claims, 4 Drawing Sheets

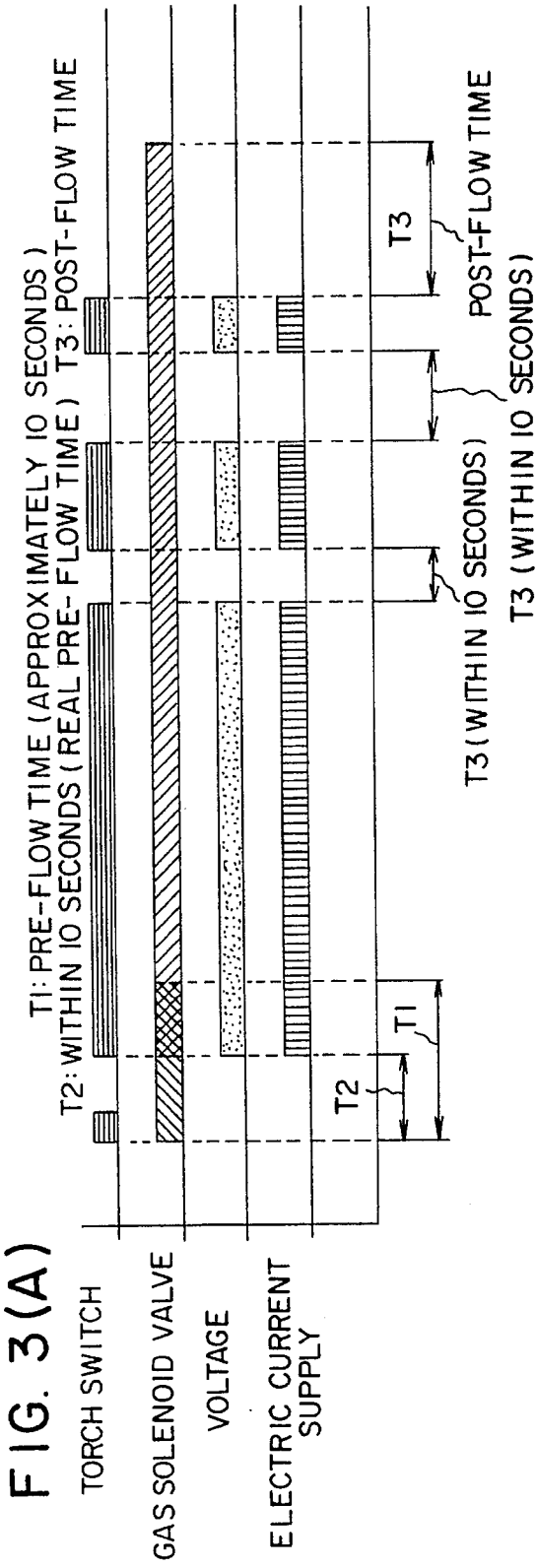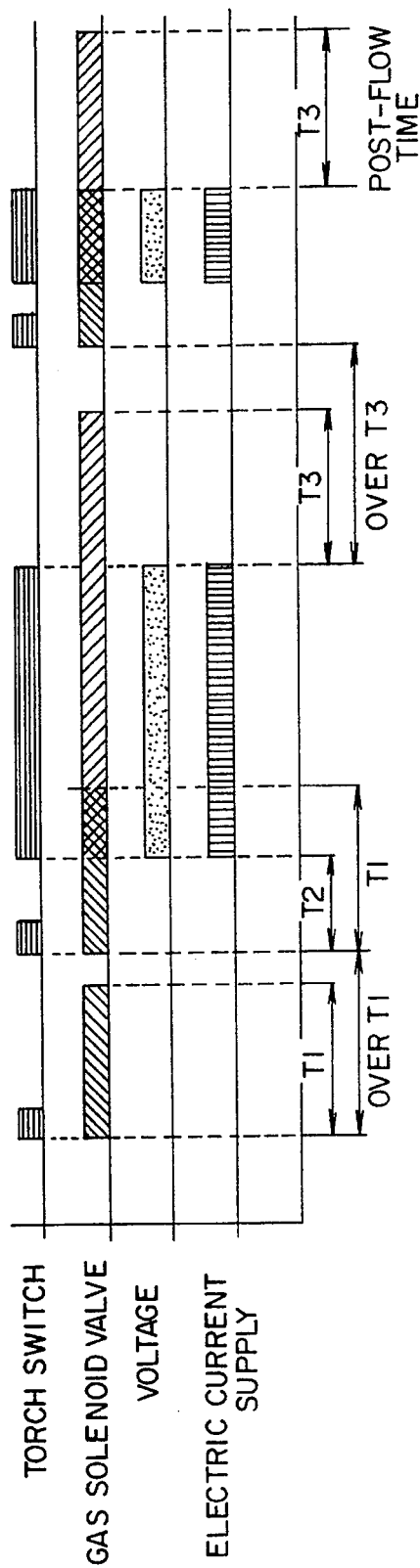

SHIELDING GAS PRE-FLOW TIME CONTROL SYSTEM FOR GAS METAL ARC WELDER

BACKGROUND OF THE INVENTION

The present invention relates to a protective gas pre-flow time control system of gas metal arc welder.

In general, a gas metal arc welding means a welding method in which an arc is generated between a continuously fed consumable type electrode wire and a base material, a shielding gas, such as, $CO_2$, argon, $CO_2$+argon, and the like, is jetted through a gas nozzle set at front end of welding torch for shielding the arc and a welded base material whereby a surrounding air is pushed out and isolated, so that an oxidation and nitration, within the welded metal, is shielded and thereby a good welded portion is made.

In order to normally execute this gas metal arc welding work, the arc welded base material should be shielded by continuously feeding a shielding gas of appropriate purity, through a gas nozzle, from immediately after an arc generation up to the welded base material is congealed after the arc is extinguished.

In accordance with this welder, as shown in FIGS. 1(A) and (B), in case when a distance between a gas nozzle of welding torch and a solenoid valve controlling a shielding gas flow is remoter than approximately 6 m, and, as in FIG. (C), in case where a shielding gas solenoid valve is opened and, simultaneously, an arc is generated, when starting a welding at a gas metal arc welding provided with double gas solenoid valve, in considering that a time of a few minutes is required until forming a gas shield film completely surrounding the welding arc environments after the gas is jetted through the gas nozzle from the solenoid valve, as in FIG. 4, when a torch switch is turned on for starting the welding by firstly opening the gas solenoid valve and, when the shielding gas is started to flow a few minutes later, a wire is fed and, simultaneously, an arc is generated, so that the gas becomes sufficient to shield the arc and the welded base material, even at the welding start portion, and, thereby, welding deficiency is prevented.

Thus, a time where the welding torch switch is made to be on and the shielding gas is jetted, before the wire feeding start time, is called a shielding gas pre-flow time.

However, such a pre-flow time control system have to meet the difficulty of directing a welding torch to a normal position at a state where it is not possible to see a welding portion or a welding torch end, during pre-flow time because, in case where time is elapsed more than one (1) second, an operator completes welding preparation, i.e., the welding torch is directed to a welding start position and the face of the welder is covered by a welding mask so as to be protected from the arc. Even if a welding torch switch is turned on, the arc is not immediately generated and is generated after delaying as much as the pre-flow time of the gas.

Therefore, in a real situation operators change the pre-flow time to less one (1) second even if there is some problem in gas shield at a welding start.

Accordingly, the present invention corrects and supplements welding start in order to overcome the various problems. Therefore, a major object of the present invention is to turn on the torch switch and, simultaneously, the arc is to be generated without difficulty and direct the torch to a normal position even maintaining a sufficient pre-flow time of more than one (1) second.

As a characteristic structure for this, in a gas metal arc welder made by a welding power means, a wire feeding device and a welding torch are made such that, when the torch switch is firstly turned on, only the shielding gas solenoid valve is made to be on whereby only the shielding gas is made to be pre-flowed. The switch is secondly turned on during the pre-flow time, the wire feeding device is operated and, simultaneously, a voltage is applied and an arc is generated so as to be able to weld. When the torch switch is turned off, stop of above described wire feeding device, stop of the shielding gas feeding, and stop of arc are made simultaneously.

BRIEF DESCRIPTION OF THE DRAWINGS

FIGS. 3(A) and 3(B) are timing charts illustrating operational states of the present invention.

DETAILED DESCRIPTION OF THE INVENTION

Figure 1A:
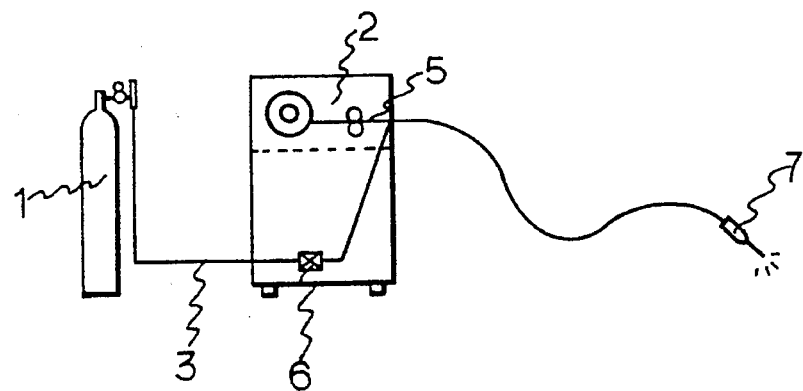
FIGS. 1(A), 1(B) and 1(C) are elevational views of gas metal arc welders.

Referring to the drawings and FIGS. 1(A), (B) and (C), a gas storage cylinder 1 and a welding power supply means 2 are connected and, in case of (A), there is provided a solenoid valve 6 in a hose 3 extended from gas cylinder 1, for feeding gas from cylinder 1 to a torch 7 by passing gas through hose 5, for approximately 6 m, together with a wire.

Figure 1B:
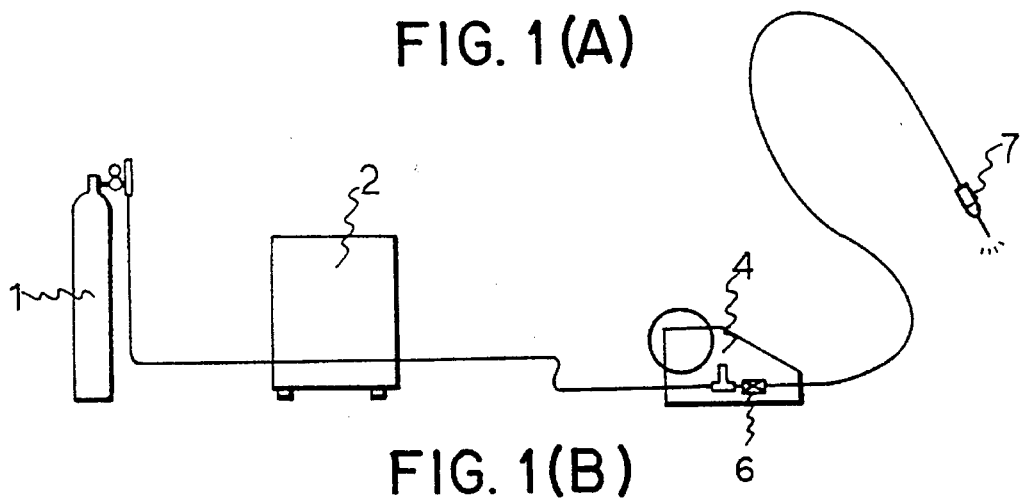

In case of the apparatus of FIG. 1(B), a wire feeder 4 is provided next to the welding power supply means 2. Gas hose 3 is connected to the wire feeder 4, through the welding power supply means 2, and is connected to solenoid valve 6 and then, is fed to torch 7 by passing through approximately 6 m together with the wire 5.

Figure 1C:
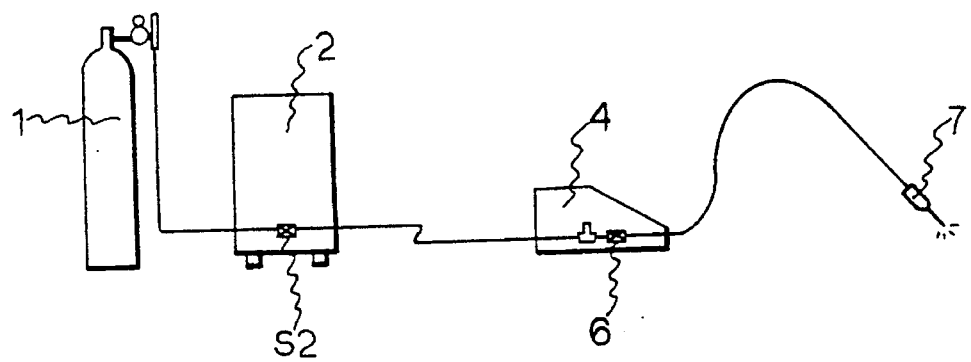

In case of the apparatus of FIG. 1(C), it is different that another double solenoid valve 52 is provided within the welding power supply means 2 in addition to the solenoid valve 6 described in FIG. 1(B) above.

Figure 2:
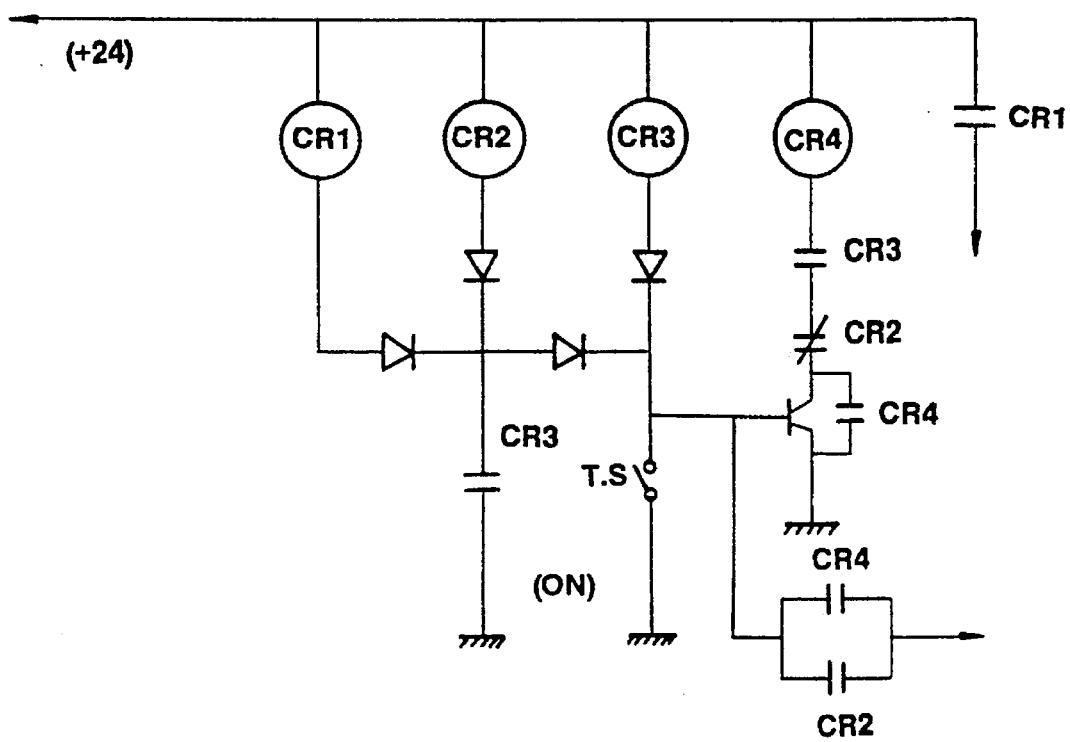
FIG. 2 is a circuit diagram showing essential elements of the present invention.
Figure 4:
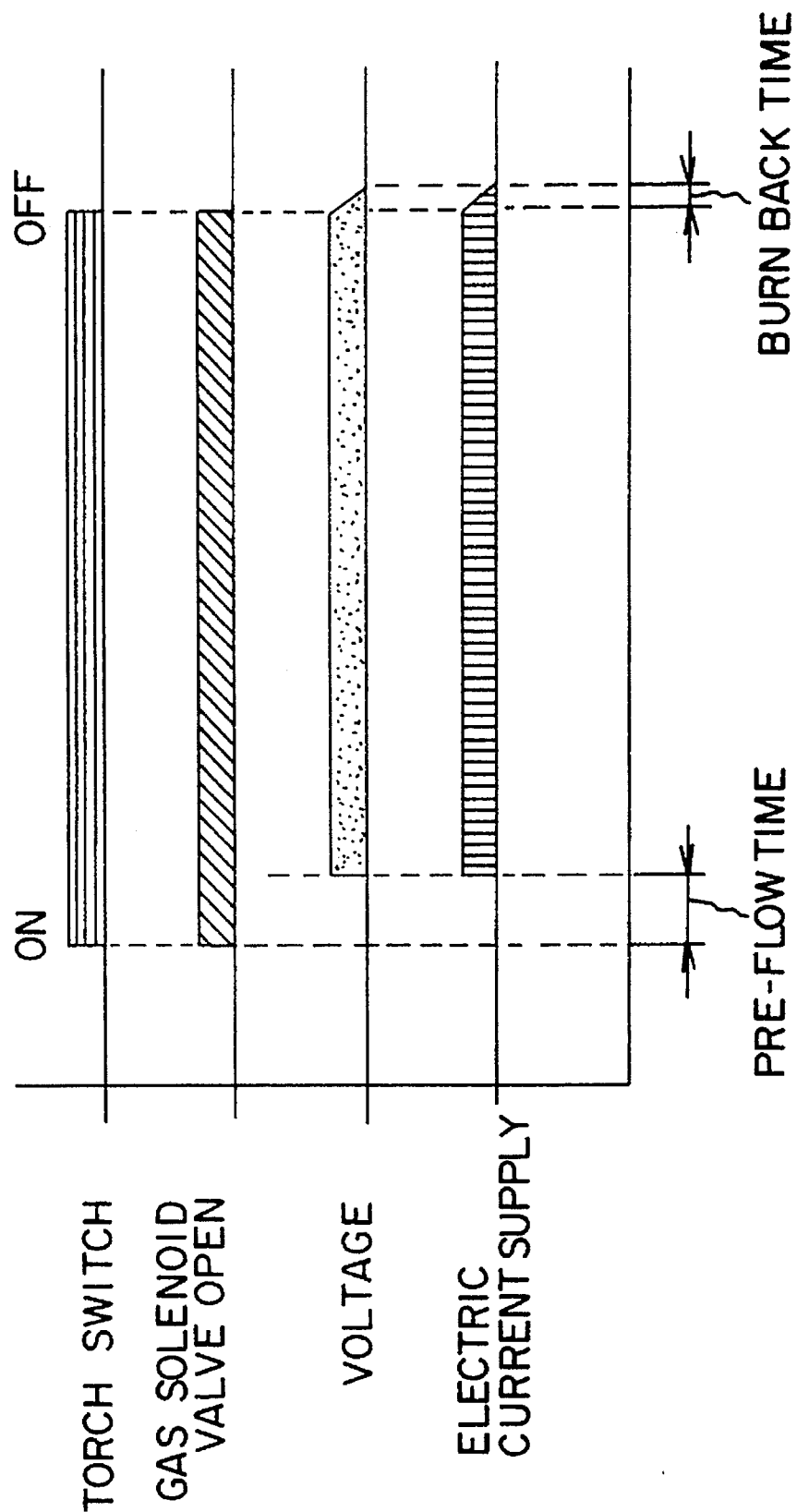
FIG. 4 is a timing chart illustrating a conventional operational state.

FIG. 2 is an electric circuit configuration for executing the present invention. FIGS. 3(A) and (B) are timing charts illustrating the operational state in accordance with the present invention. FIG. 3(A) illustrates a state of operation by turning on the torch switch during the pre-flow time, and FIG. 3(B) shows a state where the work could not immediately started during the pre-flow time, and requires starting again thereafter.

This will be described more in detail as follows.

When a welding operator, who has finished general preparation for the welding work, turns the welding torch on and off without covering his face with a welding mask at a time point which, in a conventional system, the face is covered by a welding mask, the wire feed is not executed and a voltage for generating an arc to the wire is not applied, and only the solenoid valve 6 is opened and only the shielding gas is fed.

At a time ($T_1$) opening the solenoid valve 6 can be controlled within a range of 0 second to several tens seconds in response to the requirement but, usually, approximately 10 seconds is suitable.

When the solenoid valve 6 is opened, the pre-flow time of the protective gas is started, and during this time, when the welding torch is properly directed to a place to be welded, the welder's face is covered with a face mask and the welding torch is secondly turned on. Simultaneously with this time, the wire is fed, an arc is generated and the welding word is executed.

Accordingly, actual shielding gas pre-flow time in FIGS. 3(A) and (B) is a time from first switched on time point to second switched on time point.

On the other hand, as shown in FIG. 3(B) when the second switched on time point exceeds more than approximately 10 seconds (usual pre-flow time) from the first switched on time point, it is seen that the operator does not work a welding, and in order to decrease unnecessary consumption of the shielding gas, the solenoid valve is automatically closed, as soon as the pre-flow time is terminated, and returned to a state before first turning the welding torch switch. Thereafter, an operation turning on the switch again brings the same result as turning on the first switch described above.

Thereafter, when the switch is turned off for terminating the welding work during welding progressing, the same as in conventional welder, a feeding stop of the wire and a turning off of the voltage applied to the wire and a turning off of the voltage applied to the wire are simultaneously made, the arc is extinguished, and only the solenoid valve continuously feeds the gas during a post-flow time ($T_3$).

At a time when the arc is intended to be re-generated, after the welding is terminated, that is, at a time when the arc is intended to be generated again within 0 second—several tens seconds ($T_3$ time), after turning off the welding arc, so as to be able to smoothly execute the intermittent welding work, immediately the arc becomes to be re-generated without pre-flow process of the shielding gas.

As another embodiment, in a gas metal arc welder using a double solenoid valve as shown in FIG. 1(C), it may be structured such that the on/off control of the solenoid valve by a time R of $T_1$ and $T_3$ of FIGS. (A) and (B) is applied only to the operation of the double solenoid valve S2, provided within interior of the welding power supply means 2, and the operation of the solenoid valve provided to the wire feeder is made so as to make the wire feeding, the electric current supply, and the gas solenoid valve operation to be controlled simultaneously with the torch switch on/off operation without pre-flow time ($T_1$) and post-flow time ($T_3$) as an ordinary welder control system.

Since the present invention, as described in detail above, is so structured that when the shielding gas pre-flow time is set to any predetermined time and the first torch switch is turned on or off, only the shielding gas is pre-flowed, and when secondly the torch switch is turned on during the pre-flow is progressing, immediately the arc can be generated, there is advantage that an effort waiting an arc generation during the shielding gas pre-flow time at a posture that an operator covers his face by a welding face mask and directs the welding torch at a welding portion and maintaining the shielding gas pre-flow time of more than one (1) second, can be eliminated.

Particularly, there is also advantage that the operator becomes further convenient because the arc is generated without pre-flow time in case of turning on again within $T_3$ time after the welding arc is turned off in considering that the arc on/off is repeatedly executed within a short time in an intermittent welding work in case of generating a re-arc after the welding is terminated.

What is claimed is:

1. In a gas metal arc welder having a welding power supply means, a wire feeding device and a welding torch, a shielding gas pre-flow time control system having a torch switch which, when turned on, opens a shielding gas solenoid valve for providing pre-flow of a shielding gas to a point where metal arc welding is to be performed, a second switch which, when turned on during said preflow of said shielding gas feed operates a wire feeding device and simultaneously applies a voltage to the wire and generates an arc so as to perform a welding work, and when said torch switch is turned off, stops said above described wire feeding, said shielding gas flow, and said arc all at the same time as said torch switch is turned off.

2. A shielding gas pre-flow time control system as recited in claim 1, in which at a time when said torch switch is turned off and turned on again within a predetermined time, an arc is immediately generated.

* * * * *